United States Patent [19]

Garth

[11] 3,775,696

[45] Nov. 27, 1973

[54] SYNCHRONOUS DIGITAL SYSTEM HAVING A MULTISPEED LOGIC CLOCK OSCILLATOR

[75] Inventor: Emory Carl Garth, Austin, Tex.

[73] Assignee: Texas Instruments Incorporated, Dallas, Tex.

[22] Filed: Nov. 18, 1971

[21] Appl. No.: 199,954

[52] U.S. Cl. ...................... 331/57, 307/215, 328/66, 331/135, 331/179

[51] Int. Cl. ...................... H03k 3/282, H03k 17/28

[58] Field of Search ...................... 307/215; 328/66, 328/67, 68; 331/108 C, 108 D, 135, 136, 331/179, 57

[56] References Cited

UNITED STATES PATENTS

| | | | |
|---|---|---|---|
| 3,619,669 | 11/1971 | Wheeler | 331/135 X |
| 3,295,138 | 12/1966 | Nelson | 331/31 R |
| 3,418,498 | 12/1968 | Farley | 307/215 X |
| 3,543,185 | 11/1970 | Krause | 331/179 X |
| 3,248,657 | 4/1966 | Turecki | 328/66 X |
| 3,411,107 | 11/1968 | Rees | 328/66 X |
| 3,497,712 | 2/1970 | Jungelas, Jr. | 328/66 X |
| 3,562,558 | 2/1971 | Totten | 307/215 X |
| 3,624,519 | 11/1971 | Beydler | 328/66 |

OTHER PUBLICATIONS

"Power Your Oscillator with E.C.L.," Electronic Design, Vol. 16 at p. 70–71 (Aug. 1, 1968).

*Primary Examiner*—Roy Lake
*Assistant Examiner*—Siegfried H. Grimm
*Attorney*—Harold Levin

[57] ABSTRACT

A multispeed synchronous digital system, such as a digital data processing system, includes a multispeed logic clock oscillator for producing a synchronizing clock signal. A plurality of multi-input ECL NAND gates, one for each system speed, have a common clock output. The clock output is connected in feedback relationship through cumulative time delays to the NAND gate inputs. A system operating speed is determined according to a logic control signal input to the NAND gates, with the logic control signal functioning as a speed select signal. Speed select signals are adaptable to be controlled under manual or program execution control. Adjustable delay lines enable selective adjustment of clock pulse width, and hence clock frequency for each of the plurality of system speeds.

11 Claims, 8 Drawing Figures

SYNCHRONOUS DIGITAL SYSTEM HAVING A MULTISPEED LOGIC CLOCK OSCILLATOR

The present invention may be advantageously employed in a high speed synchronous digital data processing system in conjunction with the subject matter of application Ser. No. 86,014, filed Nov. 2, 1970, entitled "Digital Data Processing System Having A Signal Distribution System" (TI-4118) and application Ser. No. 158,718, filed July 1, 1971, entitled "Synchronous Digital System Having A Clock Distribution System" (TI-4433), both by Emory C. Garth and assigned to the assignee of this invention.

In a synchronous digital system, a synchronizing signal, commonly referred to as the system clock signal, is responsible for timing and control of the system. The system clock signal is typically generated by an internal oscillator and is distributed throughout the system to control the operations of logic circuits mounted on printed circuit boards throughout the system. Since system timing and control are directly dependent on the system clock signal, the clock oscillator must be highly reliable and stable. Many synchronous digital systems employ a sinusoidal oscillator to provide the system clock signal. Sinusoidal oscillators are almost invariably subject to drift and instability. Also, the sinusoidal waveform produced by such an oscillator must be selectively shaped into a square waveform of the desired pulse width and magnitude. The frequency of the signal output of the sinusoidal oscillator is ordinarily not subject to minutely accurate adjustment. In such oscillators bulky components such as potentiometers or variable capacitors are frequently required. Thus, there are significant problems associated with many conventional logic clock oscillators currently employed in synchronous digital systems.

Most large synchronous digital systems have a single operating speed which is fixed, and not readily subject to adjustment. As logic circuits and other system components age, speed dependent problems will develop in the system. In many synchronous digital systems, there is no provision for detecting the existence of actual or potential speed dependent problems until system operation is adversely affected.

Accordingly, a basic clock oscillator unit employed in the system of this invention comprises an inverting logic circuit, e.g., a NAND gate, having its output terminal feedback-connected to its input terminal through an adjustable delay line. A digital control signal enables the NAND gate such that the output condition is controlled according to the input condition, and thus each time an output pulse cycles back to the input terminal the logic condition of the output terminal is inverted. The clock frequency is determined by the time required for two cycles from output to output, i.e., twice the circuitous signal propagation delay. The adjustable delay line enables selective time delays, or propagation delays, to be introduced, thereby enabling convenient and minutely accurate adjustment of the clock frequency. The resulting oscillator is stable, reliable and economical.

In a more particular aspect of the invention, the adjustable delay line is comprised of a plurality of segments of transmission line which are etched onto an epoxy glass circuit board, with each transmission line connecting a pair of plated terminals which extend through the circuit board. The transmission line segments are adaptable to be selectively interconnected by connecting the appropriate terminals, thereby introducing cumulative time delays. The length of the transmission line segments are binary weighted to allow the introduction of a desired time delay with a minimum number of interconnections. The NAND gate may be of conventional flat pack construction such that the leads thereof may mount directly into plated holes of the circuit board, with signal and supply voltage connection provided at respective signal and voltage layers of a multilayer printed circuit board. Thus a complete oscillator may be fabricated on a small portion of a multilayer circuit board, resulting in compact and economical construction.

In yet another aspect, the synchronous digital system of this invention employs a multispeed logic clock oscillator, providing a plurality of operating speeds. The oscillator is comprised of a plurality of basic units of the type previously discussed herein, one basic unit for each system speed. The inverting logic circuits have a common output which is feedback-connected to the inputs through successive adjustable or fixed delay lines. Logic control signals input to the logic circuits serve as speed selection signals by disabling or enabling the appropriate circuits. In this manner, any one of a plurality of system speeds may be logically selected. The actual speed of each of the system speeds may be adjusted with the adjustable delay lines.

Many practical advantages result from equipping a synchronous digital system with a plurality of operating speeds. A specific embodiment of this invention is equipped with a normal operating speed, a marginal operating speed which is slightly faster than the normal operating speed, and a slow operating speed which is slower than the normal operating speed. After the system has been assembled, it may be initially operated at the slow operating speed to faciltate system debugging and diagnosis. In this manner, initial problems can be detected and corrected. As such problems are detected and corrected, the system speed may be increased by increasing the slow speed and then going successively to the normal speed and the marginal speed, and increasing these respective speeds. The maximum speed of operation may be determined by adjusting the marginal speed. With the marginal speed set at maximum, the normal speed may be set at a fixed amount slower than this speed, providing a maximum feasible normal operating speed. The provision of a plurality of speeds also facilitates system maintenance. As the system begins to age, the operating speed may be periodically switched to marginal in order to detect speed dependent problems before they impair system performance at the normal speed of operation. These problems may be corrected before they ever become an actual system problem. The slow operating speed provides additional advantages as regards system maintenance and repair. In the slow speed of operation, circuit boards within the system may be pulled out onto an extender board without significantly impairing system operation. The additional delay introduced by the extender boards is acceptable at the slow speed, and defective components may be readily detected and conveniently replaced. Since speed selection is made with digital pulses, the system operating speed may be selected by manual selection or by program execution within the computer.

Objects and advantages of the invention will become even more apparent from the following detailed description taken in conjunction with the drawings, in which.

Figure 6:
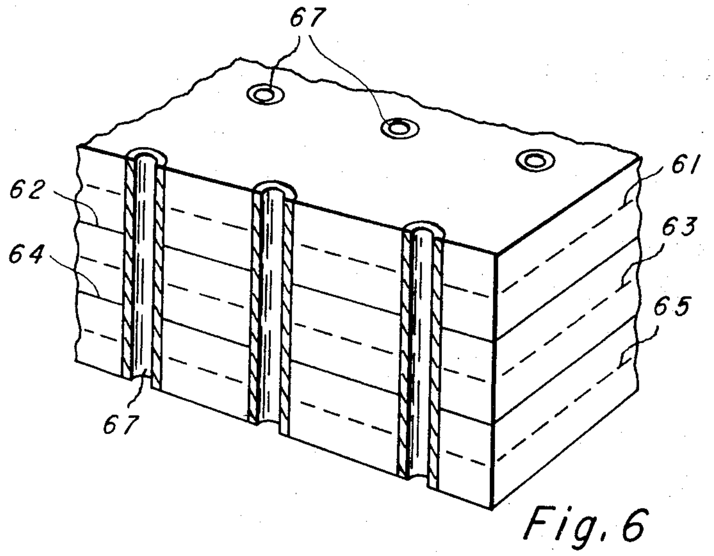

FIGS. 3, 4*a*, 4*b*, and 5 are schematic diagrams of adjustable delay lines;

FIG. 6 is a partial section view of a multilayer printed circuit board.

Reiterating briefly, the basic operable unit of the logic clock oscillator employed in this invention comprises a logic circuit having an adjustable delay line connected in feedback relationship between the input and output of the logic circuit. The logic circuit is an inverter which produces a logic zero output in response to a logic one input and produces a logic one output in response to a logic zero input. If at a given instant the logic circuit output is a logic zero, this electrical pulse signal will be transmitted through the delay line and coupled to the input of the logic circuit. This logic zero input to the logic circuit will cause the output to switch to a logic one. The time required for the logic zero to cycle through the delay line back to the input of the logic circuit and produce a logic one determines one-half of the pulse width of the logic clock signal. Thus, two complete cycles around the feedback loop are required to produce one complete cycle of the clock signal. The factors which determine this cycle time are the circuit switching speed and the propagation delay between the output of the circuit and the input thereof. Since cycle time, and thus pulse width, is dependent on the propagation delay between output and input of the logic circuit, provision of an adjustable delay line enables adjustment of the propagation delay and thus enables adjustment of the clock pulse width. The clock frequency is of course dependent on the clock pulse width. Thus, the frequency of the digital clock signal can be readily varied by adjusting the adjustable delay line.

The system of the present invention employs emitter coupled logic circuits, which have a typical switching speed on the order of two nanoseconds. For emitter coupled logic, a logic zero condition is +0.4 volts and a logic one condition is −0.4 volts. It is known in the art that a "wired OR" circuit can be produced by connecting the outputs of a plurality of emitter coupled logic circuits together. When these outputs are connected together, any one of the logic circuits can pull the common output to the high voltage, or logic zero, condition. The output of these circuits is normally internally biased to a logic one condition, but the bias can be overcome by a logic zero output of any one of the plurality of output connected circuits.

Figure 1:
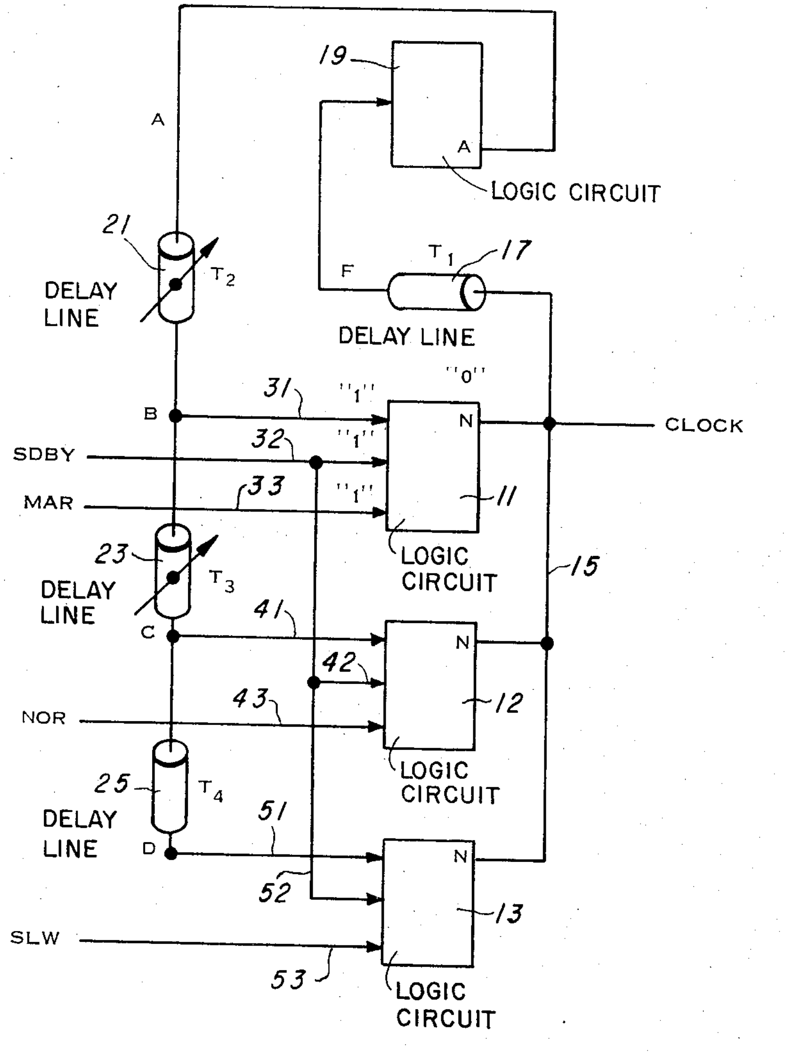
FIG. 1 is a schematic diagram of a multispeed logic clock oscillator.

Referring now to FIG. 1, there is illustrated a diagram of a multispeed logic clock oscillator having three speeds: marginal (MAR), normal (NOR), and slow (SLW). The marginal speed is the fastest of the three speeds, the normal speed is the normal operating speed, and the slow speed is the slowest of the three speeds. The speed, or frequency, of the marginal clock signal may be selectively adjusted with the adjustable delay line 21. The speed of the normal clock signal can be selectively adjusted by adjusting adjustable delay line 21 and/or adjustable delay line 23. The speed of the slow clock signal in this embodiment is a fixed amount slower than the normal speed as determined by fixed delay line 25. Logic circuits 11, 12, and 13 are NAND gates which have an inverted output terminal N. Each of these NAND gates will produce a logic zero output only if all input terminals are in the logic one condition; otherwise there is a logic one output. The output of each of the gates 11, 12 and 13 is connected together to form a common terminal or bus 15. Although the output of each of the gates 11, 12 and 13 will normally be in a logic one condition, if the output of any one of the three gates goes to the logic zero condition then the bus 15 will go to the logic zero condition. The bus 15 provides a clock signal (CLOCK) output for the system. A system standby, or master control signal, SDBY, is applied to each of the NAND gates 11–13. This signal will enable or disable the production of a clock signal. The SDBY signal will be in a logic one condition to enable the gates 11–13 and in a logic zero condition to disable these gates. When the SDBY signal is in a logic zero condition, the logic condition of the output bus 15 will be fixedly held to the logic one condition. The SDBY signal is applied to the gates 11, 12 and 13 at respective input terminals 32, 42 and 52. Gate 11 will receive a logic one MAR signal at terminal 33 when the marginal clock speed has been selected; otherwise, the condition of the MAR signal will be a logic zero. Gate 12 will receive a logic one NOR signal at terminal 43 when the normal speed has been selected; otherwise, the logic condition of the NOR signal will be logic zero thereby disabling NAND gate 12. When the slow clock speed has been selected, a logic one SLW signal will be received by NAND gate 13 at input terminal 53; otherwise, the SLW signal will be a logic zero thereby disabling NAND gate 13. Thus, when the marginal speed of operation has been selected, input terminals 32 and 33 of NAND gate 11 will both be enabled, or in the logic one condition, such that the logic condition of the output terminal of NAND gate 11, and therefore the condition of the output bus 15, will be determined by the logic condition of the input terminal 31. Similarly, when the normal speed of operation has been selected, the logic condition of input terminals 42.and 43 of NAND gate 12 will be a logic one, enabling the condition of the logic output of NAND gate 12 to be controlled by the logic condition of input terminal 41. When the slow speed of operation has been selected, terminals 52 and 53 of NAND gate 13 will be in the logic one condition, enabling the logic output condition of NAND gate 13 to be controlled by the logic condition of terminal 51.

Simultaneous occurrence of a logic one at all three terminals at any one of the NAND gates 11, 12 or 13 will produce a logic zero output on the bus 15. This situation is enabled to occur only when the standby signal SDBY and respective speed selection signal (MAR, NOR, SLW) are in the logic one condition. Since the clock oscillator has a common output terminal, it is apparent that only one clock speed is available at any time. Thus the logic conditions of signals MAR, NOR and SLW must be exclusive in that only one of these three signals can be in a logic one condition and the other two must be in a logic zero condition at any given time. In this manner, the condition of the output bus will be controlled by only one of the NAND gates 11, 12 or 13. The logic zero condition of the two nonselected speed selection signals disable the respective gates. Either or both mechanical adjustment or program execution in the computer may be used to provide digital signals MAR, NOR and SLW. In this manner, the speed of the logic clock oscillator is digitally controlled.

The logic circuit 19 is a single input AND gate having a noninverted output terminal A. The purpose of this AND gate is to enhance the integrity of the clock pulse. Copper etch transmission line has an impedance of on the order of 0.75 ohms per foot. The delay line 17 may be of a typical length of 10 feet in order to introduce a 20 nanosecond time delay, and thus will have a net impedance on the order of 7.5 ohms. Since a logic condition for ECL gates is only ± 0.4 volts in magnitude, the IR drop created by the delay lines may be rather significant, degrading the magnitude of the clock pulses to such an extent as to endanger reliability of gate switching. Due to isolation between the output and input of ECL gates, clock pulse integrity can be ensured by inserting a single input AND gate, referred to as a repeater, after each significant time delay. As a rule of thumb, a repeater is inserted after each time delay on the order of 20 nanoseconds in this system.

Figure 2A:
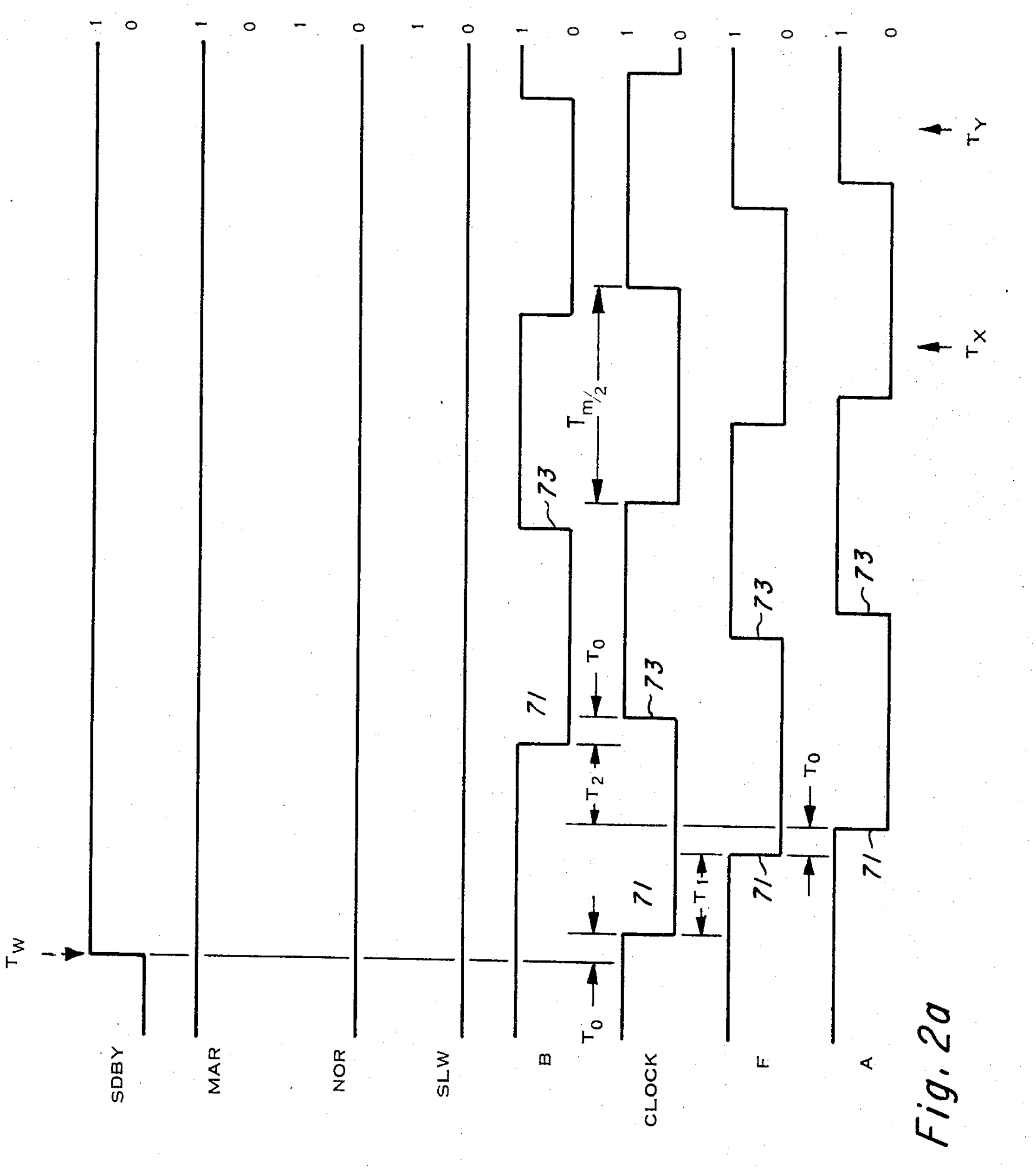
FIGS. 2A and 2B are timing diagrams illustrating the operation of the circuit of FIG. 1.

Considering now FIG. 2A in conjunction with FIG. 1, at a point in time prior to time point $T_w$ the normal and slow speeds have not been selected and thus the respective speed selection signals are in the logic zero condition, and the marginal speed has been selected such that signal MAR is in the logic one condition. Prior to $T_w$, the system is disabled by the logic zero condition of the standby signal SDBY, ensuring that the CLOCK signal on bus 15 is in the logic one condition. At time $T_w$, the standby signal SDBY changes from a logic zero to a logic one, thereby enabling the clock oscillator of FIG. 1. Considering that NAND gate 11 requires a switching time $T_0$, at time $T_0$ later than $T_w$ the clock signal changes from a logic one condition to a logic zero condition, and all three input terminals to NAND gate 11 are now in the logic one condition. The wavefront created by this situation is designated wavefront 71. This wavefront is delayed by time delay $T_1$ of delay line 17 and is input as signal F to AND gate 19, which has a noninverted output terminal A. The wavefront is delayed by a time period $T_0$, the switching time of AND gate 19, and is applied as signal A to the input of adjustable delay line 21. Signal A incurs a time delay $T_2$ during transmission through delay line 21 and is applied to the input of NAND gate 11 as signal B. This logic zero condition of signal B will cause NAND gate 11 to switch its output state to a logic one, requiring time period $T_0$ to switch, producing a wavefront 73. Wavefront 73 undergoes successive delays and is again received as signal B to the input of NAND gate 11. The transition of signal B to a logic one at wavefront 73 will cause the CLOCK output to again change to a logic zero, requiring time period $T_0$. In this manner, a clock (CLOCK) signal of a controlled pulse width i.e., of a controlled frequency, is produced. Two complete cycles of a waveform transition are required to complete one CLOCK cycle. The time required for one complete cycle of the CLOCK signal is twice the net signal propagation delay through circuit components 17, 19, 21 and 11, and is equal to $$T_m = 2(2T_0+T_1+T_2)$$

In this manner, a marginal clock signal is produced which has a controlled pulse width $T_m/2$, and a frequency of $1/T_m$. The time delays $T_0$ and $T_1$ are fixed, but time delay $T_2$ can be adjusted by adjustable delay line 21, thus enabling the marginal clock speed to be set at a desired maximum speed.

In order to simplify synchronization problems, when the clock speed is changed (for example, for marginal to normal) the standby signal is first changed to a logic zero condition to disable the logic clock oscillator. If the logic clock oscillator were not first disabled, the change of the marginal signal MAR to a logic zero would have to occur simultaneously with the change of the normal signal NOR to a logic one in order to avoid the introduction of spurious pulses.

Figure 2B:
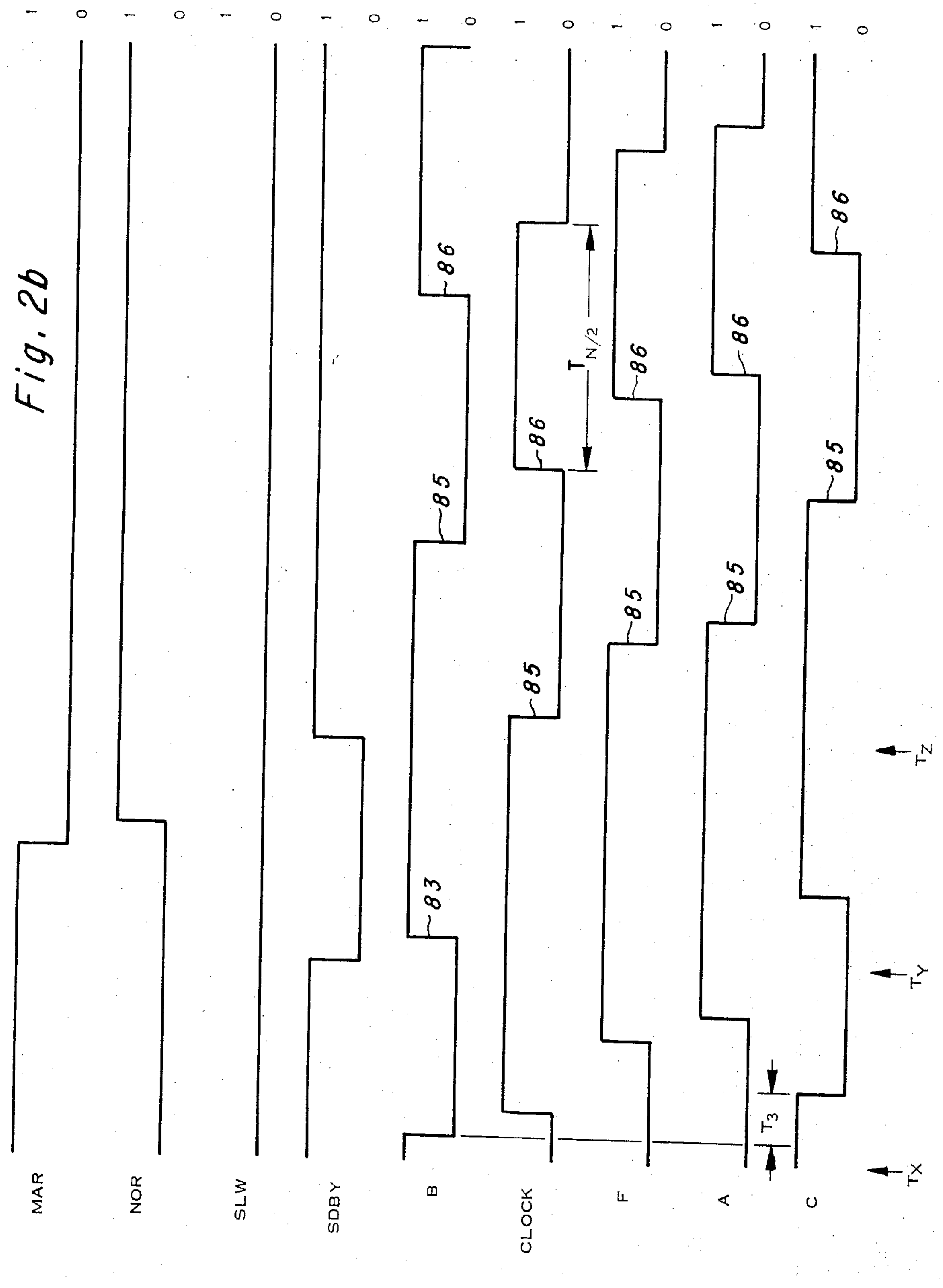

Referring now to FIG. 2B, time points $T_x$ and $T_y$ correspond to time points $T_x$ and $T_y$ of FIG. 2A. Signal C, the input signal to NAND gate 12, is delayed in time from signal B by time period $T_3$, the time delay of adjustable delay line 23. At time point $T_y$, it is desired to change the clock speed from marginal to normal, and therefore standby signal SDBY undergoes a transition from logic one to logic zero in order to disable the logic clock oscillator. Shortly after time $T_y$, the marginal signal MAR will undergo a transition to a logic zero and the normal signal NOR will undergo a transition to a logic one. It should be apparent that the order of these transitions is not critical, since the logic clock oscillator is now disabled. At some time after signals MAR and NOR have undergone their respective transitions, standby signal SDBY at time point $T_z$ undergoes a transition back to the logic one condition, thereby enabling the logic clock oscillator. Since signals MAR and SLW are now in a logic zero condition, NAND gates 11 and 13 are disabled, leaving output bus 15 subject to being pulled to the high voltage condition (the logic zero condition) only by the output of NAND gate 12.

The transition of the SDBY signal is synchronized to occur during the logic one CLOCK pulse. Thus when the SDBY signal changes from logic one to logic zero, the input signal to NAND gate 11 is already a logic zero, thereby maintaining the output of NAND gate 11 at a logic one. Therefore, the state of the output of NAND gate 11, and hence the output bus 15, is not affected by this transition of the standby signal. However, when the input signal B to NAND gate 11 returns to a logic one condition at wavefront 83, the logic output condition of gate 11 will not change since it is now disabled by the logic zero condition of the standby signal. At time point $T_z$ the standby signal undergoes a transition to a logic one and enables NAND gates 11, 12 and 13. However, NAND gate 11 is now disabled by a logic zero condition of the MAR signal and NAND gate 13 is disabled by the logic zero condition of the SLW signal. Thus, when the SDBY changes to the logic one condition at time point $T_z$, the output condition of NAND gate 12 changes to a logic zero at time period $T_0$ later, this transition being designated as wavefront 85 in FIG. 2B. This transition to the logic zero condition pulls the output bus 15 to the logic zero condition. Wavefront 85 is delayed by time period $T_1$ of delay line 17 and input as signal F to AND gate 19. Output signal A of AND gate 19, having undergone time delay $T_0$ of gate 19, is input to adjustable delay line 21 and undergoes time delay $T_2$. Output signal B of adjustable delay 21 is delayed by time period $T_3$ of adjustable delay line 23 and is input as signal C to NAND gate 12. The logic zero condition of signal C, resulting from wavefront 85, causes the output state of NAND gate 12 to change to a logic one at wavefront 86. The net time delay incurred from one cycle of the pulse through delay line 17, gate 19, delay line 21, delay line 23 and gate 12 is equal to the pulse width, as given by the following equation:

$$T_n/2 = 2T_0 + T_1 + T_2 + T_3$$

The cycle width $T_n$ is therefore given by the following equation:

$$T_n = 2(2T_0 + T_1 + T_2 + T_3)$$

and the frequency is $1/T_n$. Wavefront 86 is delayed by time period $T_1$ of delay line 17 and input as signal F to gate 19. Output A of gate 19 is successively delayed by delay lines 21 and 23 and is input as signal C to NAND gate 12. A logic one condition resulting from the wavefront 86 of signal C causes the CLOCK output of NAND gate 12 to again change to the logic zero condition.

In a similar manner, in the SLW speed of operation the MAR and NOR signals are maintained in a logic zero condition, while the SLW is a logic one. Thus gates 11 and 12 are disabled and gate 13 is enabled. The SLW CLOCK pulse width is increased by the time delay $T_4$ of delay line 25, resulting in a net increase in cycle width of $2T_4$. The resulting frequency is $$1/T_n + 2T_4$$

In a specific embodiment of this invention, the delay lines are selected lengths of copper transmission line etched onto an epoxy-glass circuit board onto which the remaining components have been mounted. The propagation delay of copper etch on epoxy-glass circuit boards is six inches per nanosecond, such that each foot of transmission line introduces a two nanosecond time delay.

Figures 3, 4A:
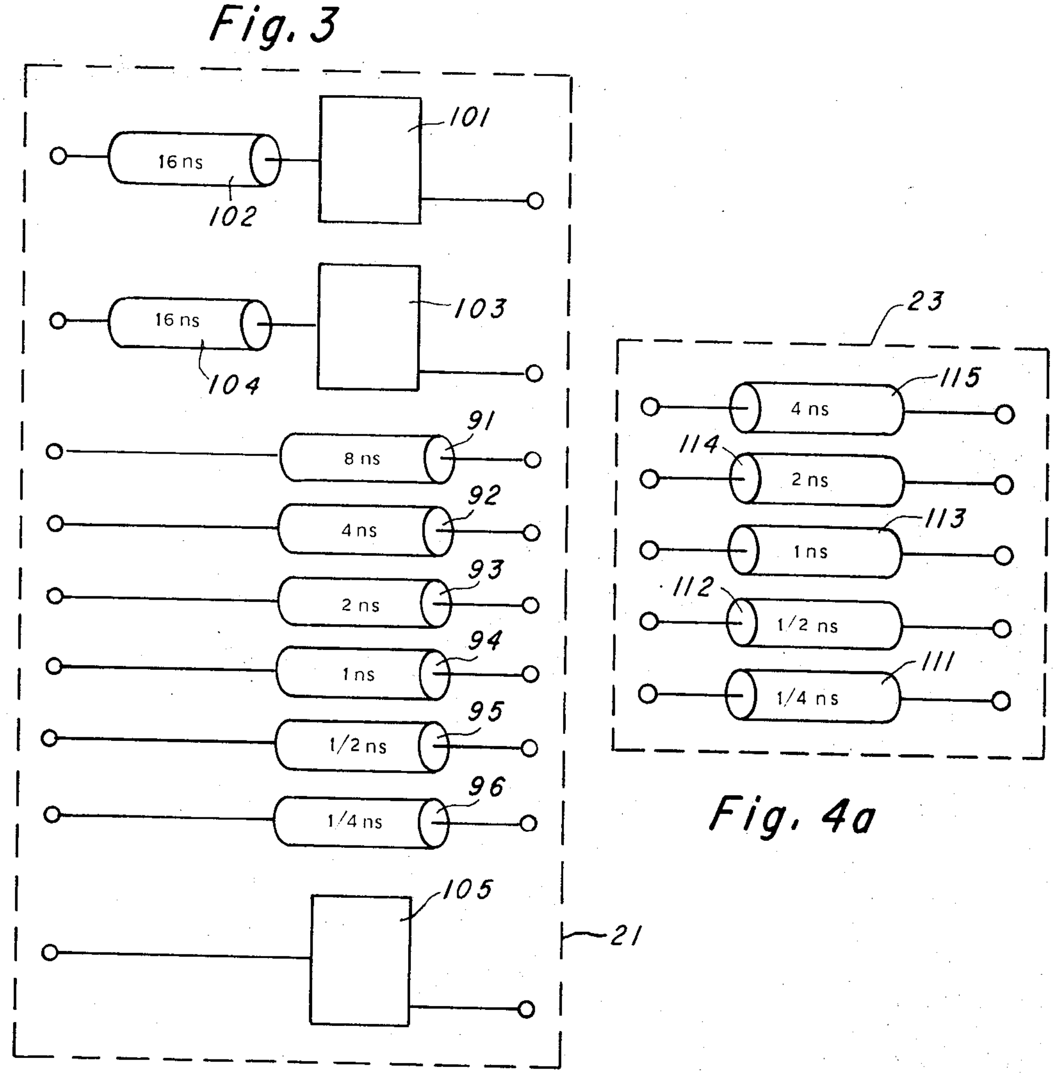

An adjustable delay line 21 employed in a specific embodiment of this invention is schematically illustrated in FIG. 3. The adjustable delay line comprises a plurality of discrete time delay components which are adaptable to be selectively interconnected to introduce a desired time delay. Time delay components 91–96 are binary weighted lengths of transmission line. Delay component 96 is a 1.5 inch segment of copper etch transmission line, which will introduce a 0.25 nanosecond time delay. Delay component 95 is a 3.0 inch segment of transmission line, which will introduce a 0.5 nanosecond time delay. Delay component 94 is a 6.0 inch segment of transmission line which will introduce a 1.0 nanosecond time delay. Similarly, the delay components 93, 92 and 91 introduce respective time delays of 2.0, 4.0 and 8.0 nanoseconds, as a function of transmission line length. Since the time delays introduced by components 96–91 are binary weighted, the delay introduced by each successive component is twice that introduced by its predecessor, and a minimum number of interconnections is required to introduce a specific desired time delay. The adjustable delay line 21 further comprises a 96 inch segment of transmission line for introducing a sixteen nanosecond time delay, followed by a single input AND gate to ensure the integrity of the pulse. Two such combinations 102, 101 and 104, 103 are provided. An additional single input AND gate 105 is provided to further enhance pulse integrity. Each of the gates 101, 103 and 105 will also introduce a two nanosecond time delay. Thus the adjustable delay line 21 is adaptable to introduce a desired time delay, to the nearest 0.25 nanosecond, anywhere between 0.25 nanosecond and 53.75 nanoseconds by selective interconnection of the components thereof.

A schematic diagram of the adjustable delay line 23 is illustrated in FIG. 4A. Delay components 111–115 are selective lengths of transmission line which will introduce respective time delays of 0.25 nanosecond, 0.5 nanosecond, 1.0 nanosecond, 2.0 nanoseconds, and 4.0 nanoseconds. Thus these components may be selectively interconnected to introduce a desired time delay between 0.25 nanosecond and 7.75 nanoseconds to the nearest 0.25 nanosecond. The adjustable delay line 23 enables the normal system speed to be set slower than the marginal speed by an amount between 0.5 nanosecond and 15.5 nanoseconds, twice the net time delay.

It should now be apparent that the system of this invention is readily adaptable to multilayer printed circuit board technology. A preferred system of this invention employs multilayer printed circuit boards which are comprised of alternate signal and voltage planes. Plated holes which extend through the circuit board are provided for signal interconnection. At each voltage plane, selective ones of these plated holes are connected to a sheet of copper at that plane, providing for connection of circuit components to a supply voltage, while the remaining plated holes are insulated from the voltage plane by a region of exposed epoxy. Signal interconnection at the signal planes is provided by copper strip line transmission lines which interconnect selective plated holes. For example, the circuit board of FIG. 6 is comprised of signal planes 61, 63 and 65 and of voltage planes 62 and 64. The circuit board further comprises a plurality of plated holes 67 which extend therethrough. Copper strip line transmission lines interconnect selective ones of the plated holes 67 to provide the desired signal interconnections. Selective ones of the plated holes 67 establish electrical contact with the appropriate voltage layer 62 or 64 to furnish operating voltages to the circuit components. The circuit components, or logic circuits, have leads which plug directly into and are soldered into the plated holes 67, thus providing for signal and voltage interconnection with the circuits.

Figure 4B:
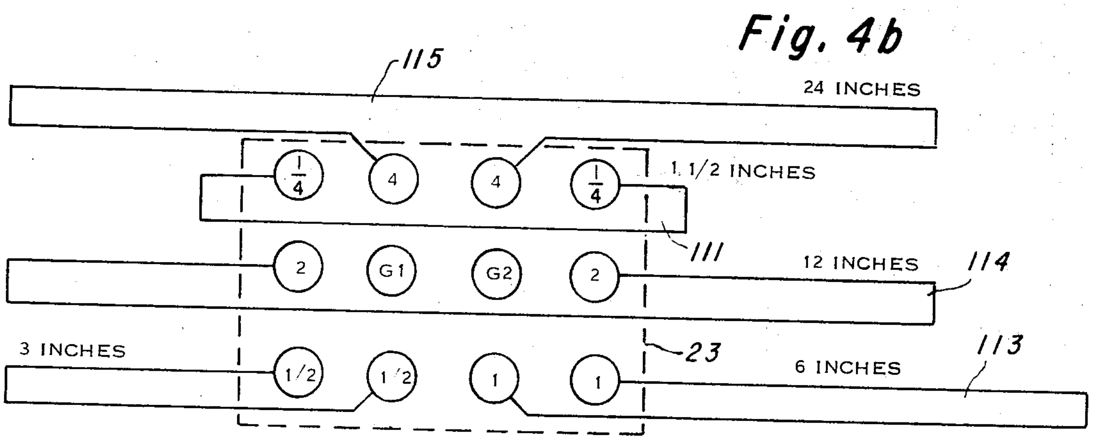

FIG. 4B is a schematic diagram of delay line 23 which is arranged according to the stated precepts. Delay component 115 is comprised of a 24 inch segment of transmission line which interconnects lead terminals labeled 4. Delay component 114 is comprised of a 12 inch segment of transmission line which interconnects the plated terminals labeled 2, thus to introduce a 2.0 nanosecond time delay. Plated terminals 1 are interconnected by a 6.0 inch segment of transmission line to introduce a 1.0 nanosecond time delay. The plated terminals labeled ½ are interconnected by a 3.0 inch segment and the plated terminals labeled ¼ are interconnected by a 1.5 inch segment, thus to introduce respective time delays of 0.5 nanosecond and 0.25 nanosecond. The plurality of plated holes which comprise the adjustable delay line are closely spaced together such that selected ones may be interconnected by short wire jumpers while only introducing negligible time delays. The terminals labeled G are provided for signal input and output. Considering, for example, that it is desirable to introduce a 3.25 nanosecond time delay, the adjustable delay line 23 can introduce this time delay by selective interconnection of the components 111, 113 and 114.

Figure 5:
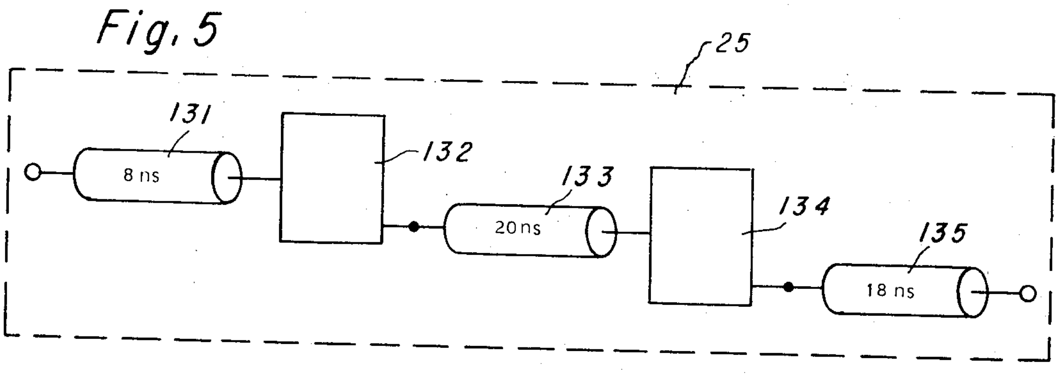

The delay line 25 employed in this invention is illustrated in FIG. 5. This delay line is comprised of delay components 131, 133 and 135 and of logic gates 132 and 134. Delay component 131 consists of a 48 inch segment of transmission line for introducing an 8.0 nanosecond time delay. The logic gate 132 is provided to ensure pulse integrity, and introduces a 2 nanosecond time delay due to its switching speed. Delay component 133 consists of a 10 foot segment of transmission line for introducing a 20 nanosecond time delay, and delay component 135 consists of a 9.0 foot segment of transmission line for introducing an 18 nanosecond time delay. The logic circuit 134 ensures pulse integrity and introduces an additional 2 nanosecond time delay. The net time delay of fixed delay line 25 is 50 nanoseconds. Thus, the system is equipped with a slow speed which is 100 nanoseconds slower than the normal system speed.

Although invention has been described in detail with reference to a specific embodiment thereof, it is to be understood that the description herein is intended as only illustrative of the principles disclosed.

What is claimed is:

1. A multispeed logic clock oscillator operable to produce a logic clock signal of a selected controlled frequency in response to a speed select signal, comprising:

a. a plurality of bilevel devices, including at least first and second bilevel devices, having a common clock output and each having a clock input and an enabling input coupled to receive said speed select signal;

b. a first signal delay means coupling said common clock output to the clock input of said first bilevel device;

c. a second signal delay means coupling the clock input of said first bilevel device to the clock input of said second bilevel device; and d. for the remaining bilevel devices in succession, a signal delay means coupling the clock input of a prior bilevel device to the clock input of the successive bilevel device.

2. The logic clock oscillator of claim 1 wherein at least one of said signal delay means is an adjustable delay line.

3. The logic clock oscillator of claim 2 wherein said adjustable delay line is comprised of a plurality of segments of transmission line connecting pairs of plated terminals in a printed circuit board, adaptable to be selectively interconnected to introduce a cumulative time delay.

4. The logic clock oscillator of claim 3 wherein said segments of transmission line are binary weighted in length.

5. The logic clock oscillator of claim 3 wherein said adjustable delay line further comprises at least one logic circuit for enhancing the integrity of the clock pulse.

6. The logic clock oscillator of claim 1 wherein said bilevel devices are multiple input ECL NAND gates.

7. A method of adjusting the operating speed of a synchronous digital system comprising:

a. coupling a common output terminal of a plurality of bilevel devices through successive time delay means to the input terminals of said bilevel devices;

b. selectively enabling one of said bilevel devices which corresponds to a desired system operating speed; and c. operating the selected bilevel device to continuously produce an output signal which is the inverse of the input signal thereto.

8. The method of claim 7 further comprising the step of adjusting the time delay introduced by at least one of said time delay means to adjust said desired system operating speed.

9. A synchronous digital system comprising:

a. a plurality of logic cards located throughout said system, said logic cards including thereon a plurality of logic circuits coupled to be operatively controlled by a system clock signal; and b. a multispeed logic clock oscillator operable to produce said system clock signal and comprising:

1. a plurality of bilevel devices, including at least first and second bilevel devices, having a common clock output and each having a clock input and an enabling input coupled to receive a speed select signal;
2. a first signal delay means coupling said common clock output to the clock input of said first bilevel device;
3. a second signal delay means coupling the clock input of said first bilevel device to the clock input of said second bilevel device; and
4. for the remaining bilevel devices in succession, a signal delay means coupling the clock input of a prior bilevel device to the clock input of the successive bilevel device.

10. The system of claim 9 wherein at least one of said signal delay means is an adjustable delay line comprised of a plurality of transmission line segments connecting pairs of plated terminals in a printed circuit board, adaptable to be selectively interconnected to introduce a cumulative time delay.

11. The system of claim 10 wherein said transmission line segments are binary weighted in length.

* * * * *